Figure 17:
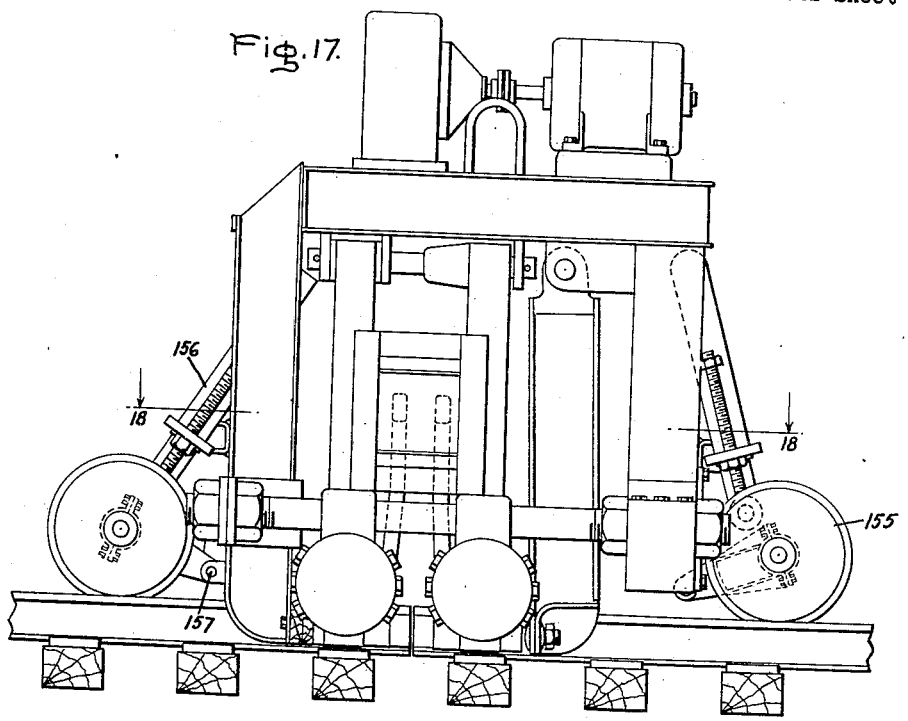

Aug. 20, 1940.                    W. DALTON                    2,212,393
                              RAIL WELDING MACHINE
                              Filed Oct. 29, 1938            6 Sheets-Sheet 1
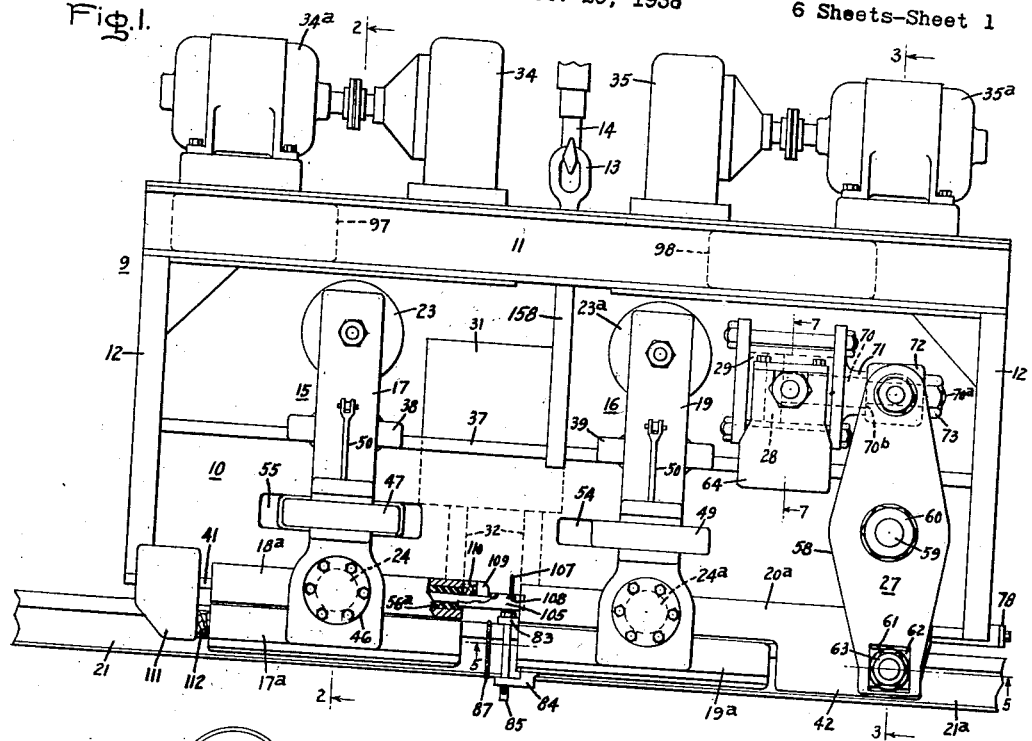
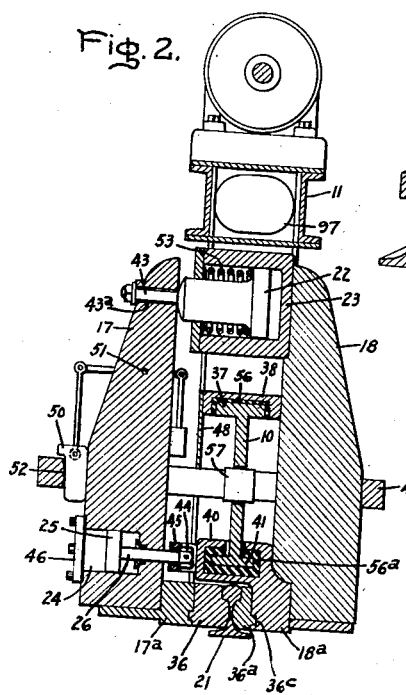
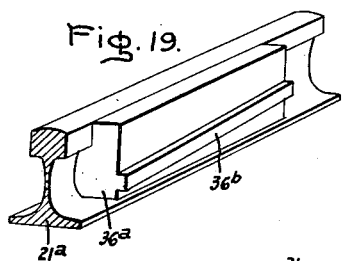
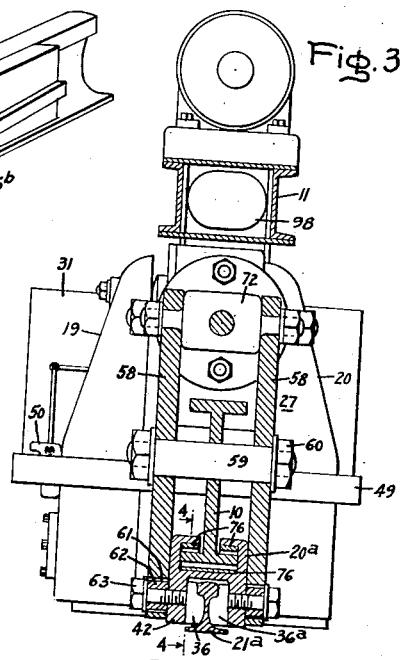
Inventor:
William Dalton,
by Harry E. Dunlavy
His Attorney.

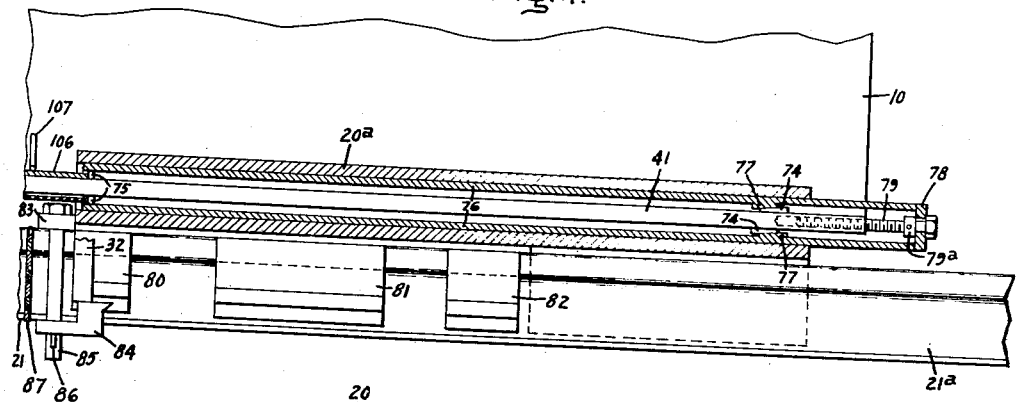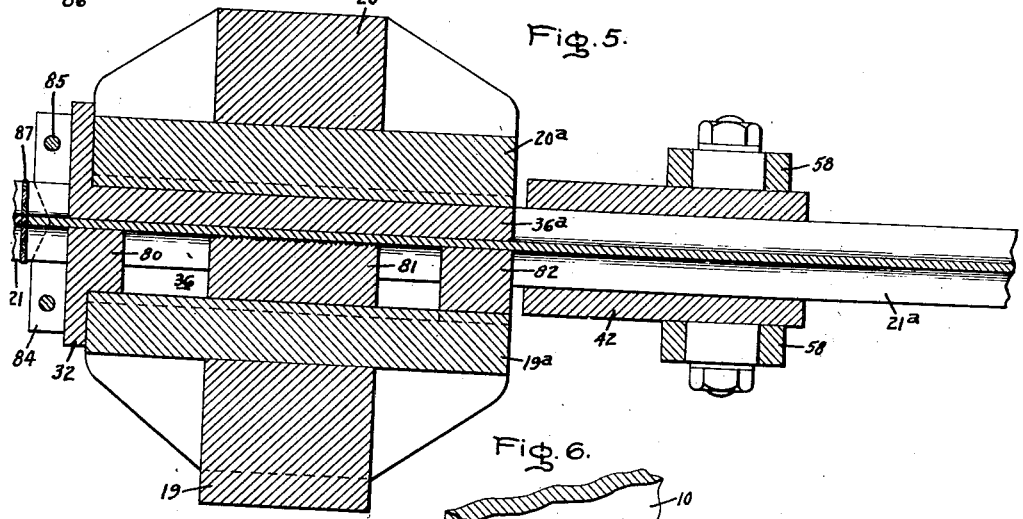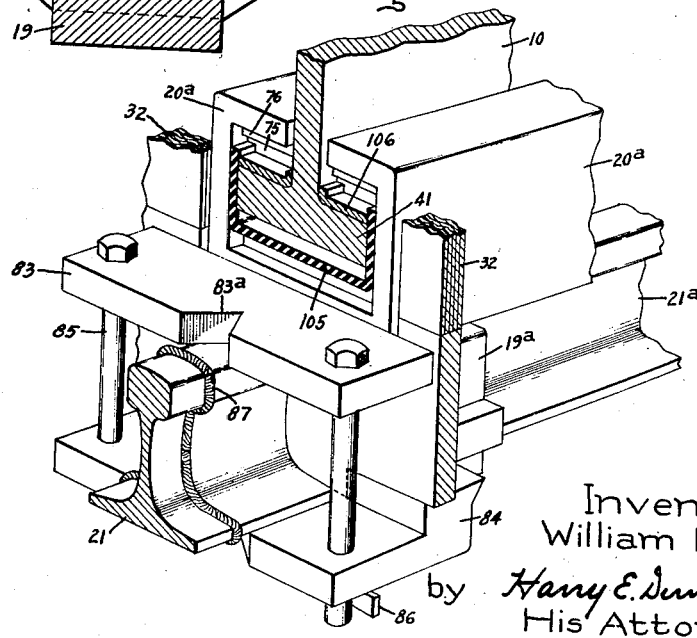

Aug. 20, 1940.                    W. DALTON                    2,212,393
                              RAIL WELDING MACHINE
                             Filed Oct. 29, 1938              6 Sheets-Sheet 3
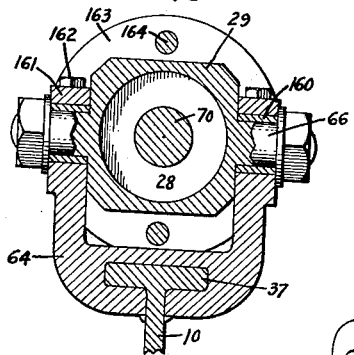
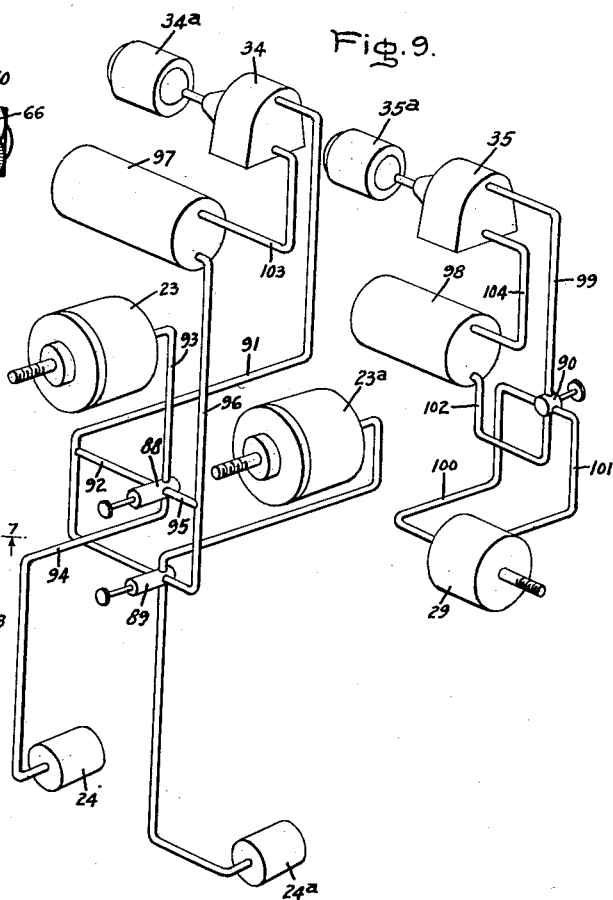
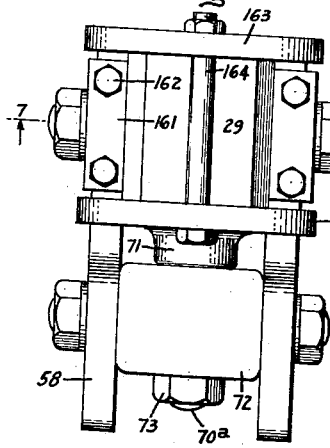
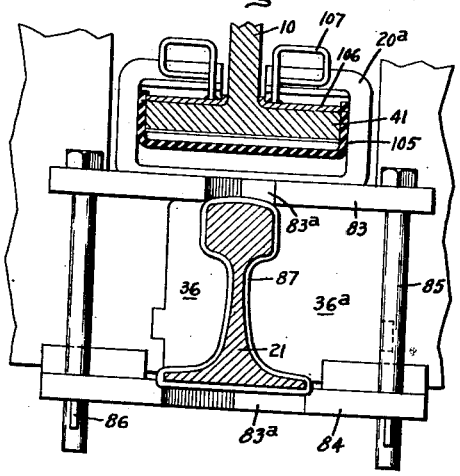
Inventor:
William Dalton,
by Harry E. Dunham
His Attorney.

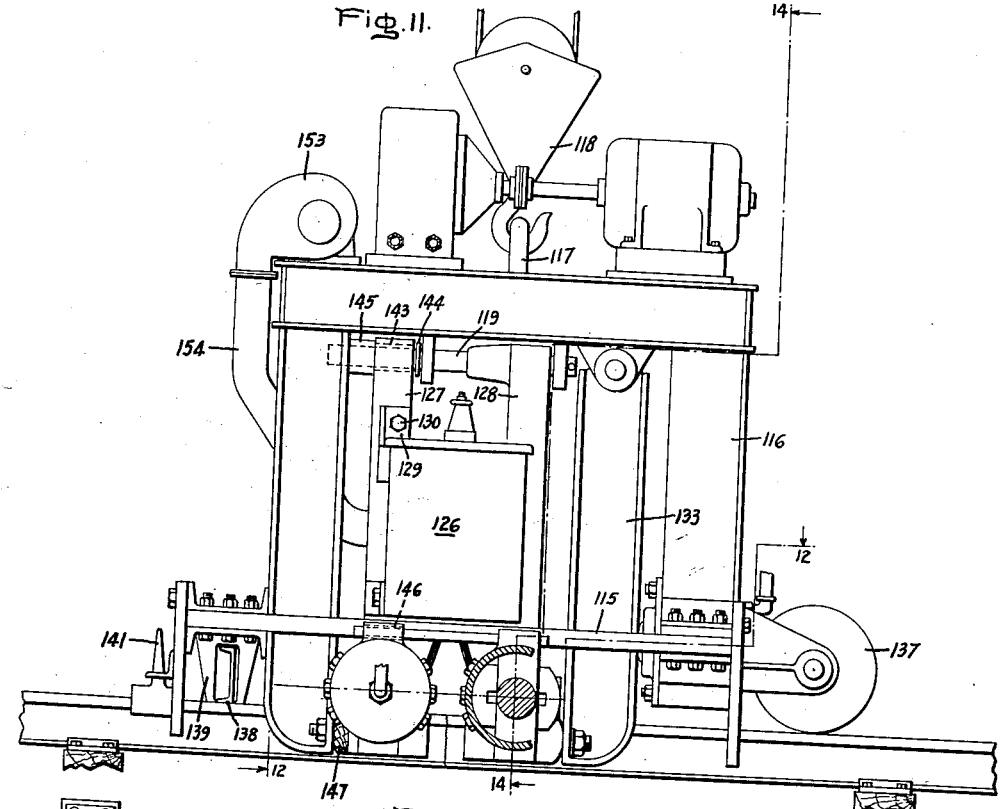
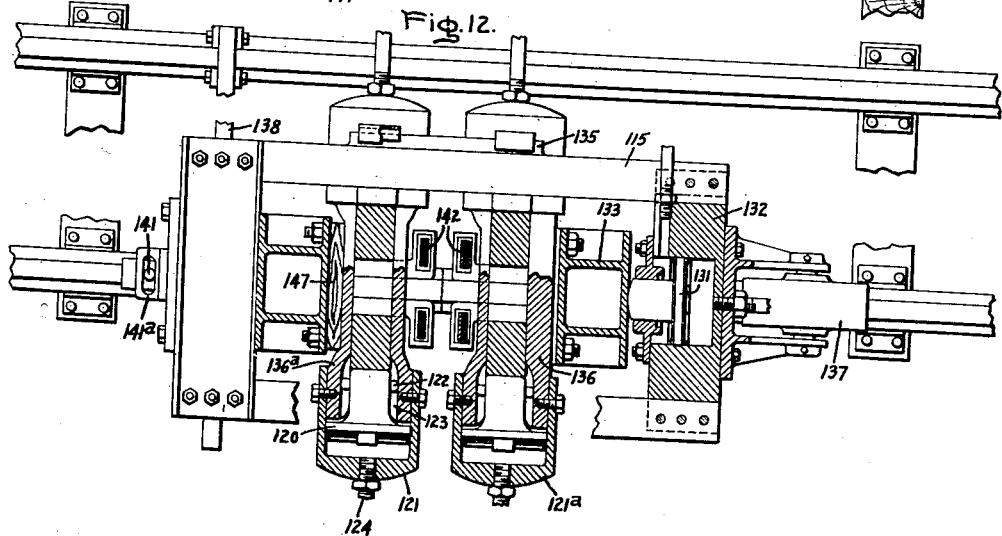

Aug. 20, 1940.  W. DALTON  2,212,393
RAIL WELDING MACHINE
Filed Oct. 29, 1938  6 Sheets-Sheet 5
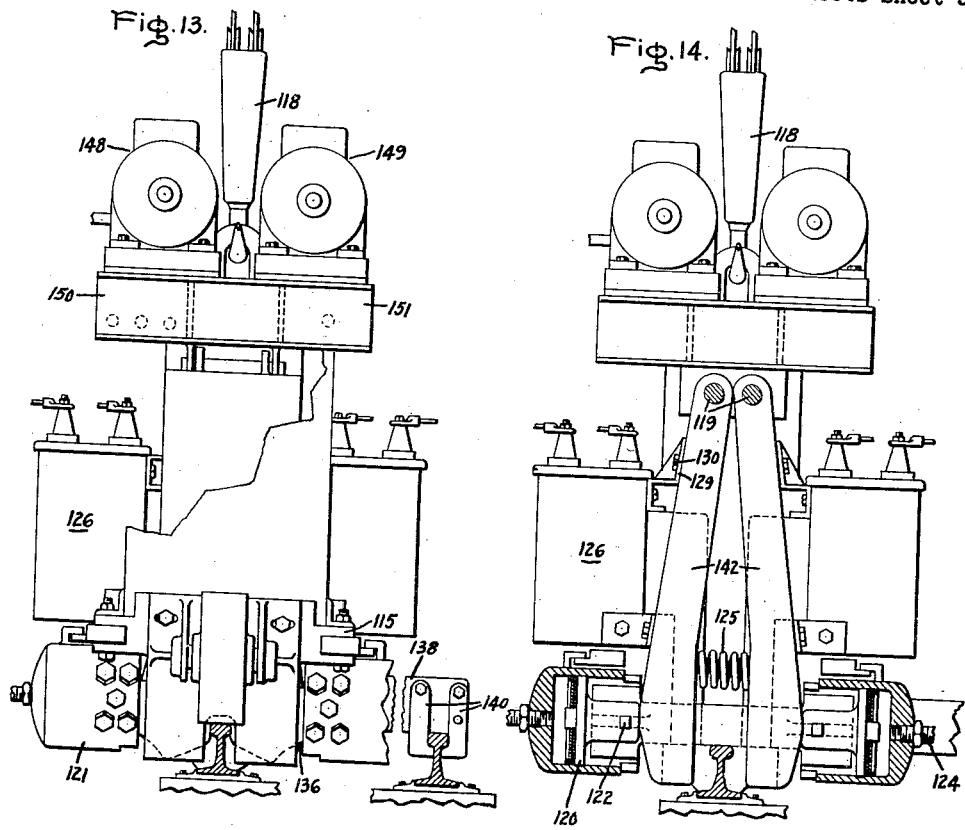
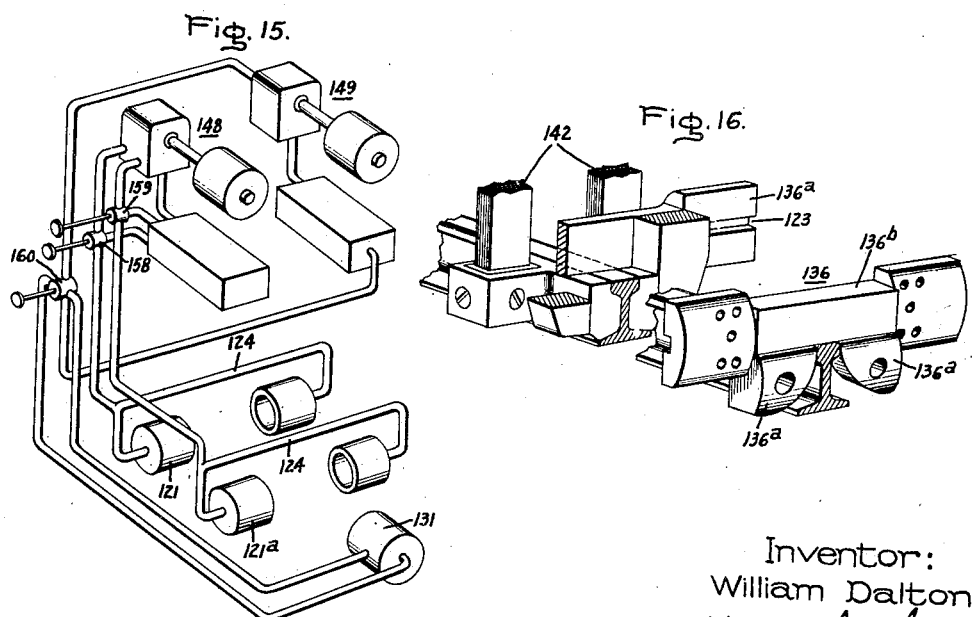
Inventor:
William Dalton,
by Harry E. Dunham
His Attorney.

Inventor:
William Dalton,
by Harry E. Dunham
His Attorney.

Patented Aug. 20, 1940

2,212,393

UNITED STATES PATENT OFFICE 2,212,393

RAIL WELDING MACHINE

William Dalton, Schenectady, N. Y., assignor to General Electric Company, a corporation of New York Application October 29, 1938, Serial No. 237,713

10 Claims. (Cl. 219—4)

My invention relates to butt welding apparatus and more particularly to resistance butt welding apparatus.

It is an object of my invention to provide a readily portable apparatus which is suitable for welding heavy sections.

It is a further object of my invention to provide apparatus particularly suited for welding rails together in order to provide a continuous rail of any desired length. A continuous rail of this type has many advantages. Rail end batter is eliminated thereby decreasing track and rolling stock maintenance, the first cost of the track is lowered, bonding of track circuits is eliminated, better conductivity is provided between rails so that less electric current is necessary for track circuits and less power is required to haul trains over the track, and noise occasioned by the train crossing the rail joints is eliminated thereby increasing passenger comfort.

When articles of irregular cross section such as rails are butt welded it is necessary to tilt the articles with respect to each other so that the welded article will be straight and not bent after the welding operation. Accordingly, it is another object of my invention to provide apparatus for tilting at the proper angle one article to be welded with respect to the other article.

Still a further object is to provide improved apparatus for supporting the articles during the welding operations.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawings in which Fig. 1 is a side elevational view of one embodiment of my invention; Fig. 2 is a view in cross section taken along the line 2—2 of Fig. 1; Fig. 3 is another cross sectional view of the apparatus disclosed in Fig. 1 taken along the line 3—3 of Fig. 1; Fig. 4 is a view in cross section taken along the line 4—4 of Fig. 3, and showing the arrangement for tilting one of the articles to be welded with respect to the other article; Fig. 5 is a cross sectional view, taken along the line 5—5 of Fig. 1 and showing the structure of the rail engaging contacts; Fig. 6 is an enlarged perspective view of a flash cutter forming part of the apparatus of Fig. 1; Fig. 7 is a view in cross section of a detail of my invention taken along the line 7—7 of Fig. 1 or Fig. 8; Fig. 8 is a top view of the push-up mechanism of Fig. 1; Fig. 9 is a diagrammatic representation of the fluid control system for operating the clamping and push up mechanisms of Fig. 1; Fig. 10 is a view of a splatter guard and a flash remover suitable for use with the apparatus shown in Fig. 1.

Figure 18:
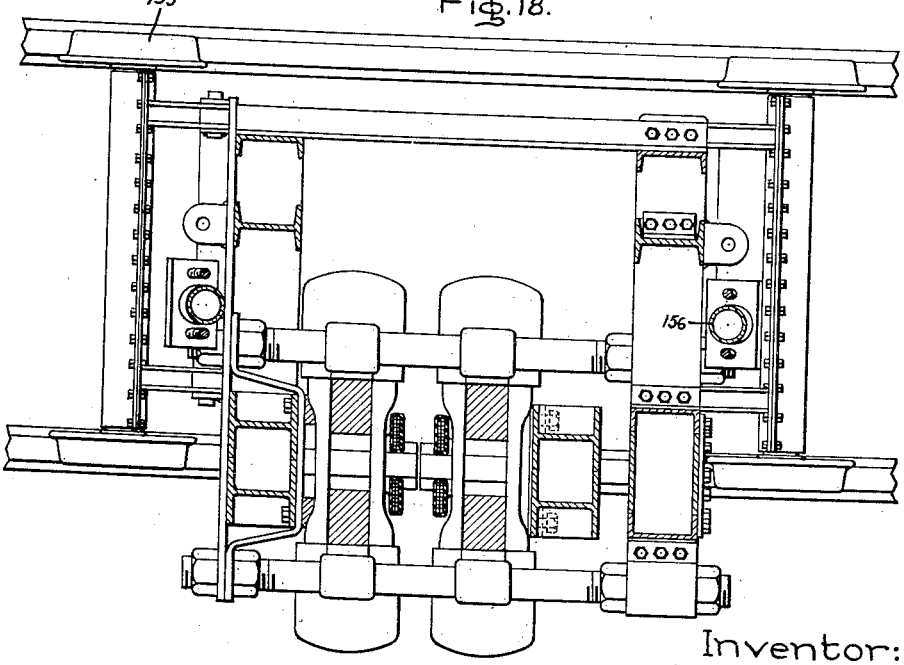

Figs. 11 to 16, inclusive, are illustrative of a modification of my invention, Fig. 11 being a side elevational view, Fig. 12 being a sectional view taken along the line 12—12 of Fig. 11, Fig. 13 being an end view partly broken away, Fig. 14 being a cross sectional view taken along the line 14—14 of Fig. 11, Fig. 15 showing schematically the control arrangement for the modification illustrated in Figs 11 to 16, inclusive, and Fig. 16 being a perspective view of certain details. Figs. 17 and 18 are views of a second modification of my invention, Fig. 18 being taken along the line 18—18 of Fig. 17. Fig. 19 is a perspective view showing an alternative form of apparatus for tilting one of the articles to be welded.

In Figs. 1 to 10 inclusive, I have shown a portable rail welding apparatus adapted for flash welding abutting rails in the track of a railway system. The apparatus generally comprises an I-beam 10 supported in a frame or support 9 including a horizontal section 11 and vertical sections 12. The section 11 is provided with a bail 13 by means of which the machine as a whole may be lifted from place to place through the agency of a crane, the hook 14 of which is illustrated in the drawings. A pair of clamps 15 and 16 comprising jaws 17, 18 and 19, 20, respectively, are supported on the I-beam 10. Contact blocks 17a, 18a, and 19a, 20a are secured to the lower ends of the clamping jaws 17, 18 and 19, 20, respectively. Contacts, indicated generally at 36 and 36a, shaped to fit the contour of the article to be welded, are secured to the contact blocks. The jaws are pressed into engagement with rails 21 and 21a by means of hydraulic pressure applied through pistons 22 operating within clamping cylinders 23, 23a. In order to release the clamping action on the rail I have provided a set of releasing cylinders 24 and 24a in which pistons 25 cause rods 26 to separate the clamping ends of the jaws 17, 18 and 19, 20, respectively.

In order to move the rails relatively to each other I have provided a push-up mechanism including a lever 27 pivotally supprted on the I-beam 10. One end of the lever 27 is reciprocated according to the direction of travel of piston 28 within push-up cylinder 29 which is also supported on the I-beam 10. The other end of the lever 27 is pivotally attached to contact block 20a which is secured to the clamping jaw 20. Welding current is supplied to the contacts engaging the rails 21 and 21a from transformers 31 by means of terminals 32.

The horizontal section 11 is provided with two storage tanks 97 and 98 for containing the fluid to operate the clamping jaws and the push-up mechanism. Pumps 34 and 35 driven by motors 34a and 35a, respectively, are provided for pumping the fluid to operate the pistons.

The clamps 15 and 16 are carried on the upper flange 37 of the I-beam 10 by means including guide blocks 38 and 39 suitably secured to the inner faces of jaws 18 and 20, respectively, as by welding. A groove is provided in the underside of blocks 38 and 39, the groove being of such a shape as to fit over the upper flange 37 of the I-beam 10. The contact block 18a which is suitably secured to the lower end of clamping jaw 18, as by welding, has an offset portion or guide 40 encircling the lower flange 41 of the I-beam 10. The contact black 20a is similarly secured to the jaw 20 but is provided with a channel shaped extension 42 to which the lever 27 is pivotally secured and which extends on both sides of the rail 21a for a purpose to be described later.

Clamping cylinders 23 and 23a are suitably secured as by welding to the upper end of the jaws 18 and 20, respectively. Pistons 22 adapted to reciprocate within the cylinders 23 and 23a are provided with piston rods 43 which are suitably attached to the movable jaws 17 and 19, respectively, thus supporting the movable jaws 17 and 19. Bores 43a through which rods 43 pass should be larger in diameter than rods 43 in order to permit the piston to rock on the surface of jaws 17 and 19 as will appear later. The contact blocks 17a and 19a are suitably secured to the lower end of movable jaws 17 and 19, respectively, in any suitable manner as by welding. The contacts 36 and 36a may be carried by the contact blocks in any suitable manner, as by a tongue and groove arrangement.

If desired, the tongue and groove arrangement may be in the form of a dovetail in order to insure that contacts 36 and 36a will remain in position with respect to contact blocks 17a and 18a when the clamping mechanism is not being used. It will be apparent that a different set of contacts must be used for each different section to be welded so that the contacts will accurately fit the contours of the articles being welded. By means of this tongue and groove arrangement one set of contacts may be substituted for another simply by sliding the contacts 36 and 36a out of engagement with contact blocks 17a and 18a and sliding the new set of contacts into place.

The rod 26 of piston 25 reciprocating within the releasing cylinders 24 and 24a formed in the lower ends of movable jaws 17 and 19 is provided with a nut 44 secured to contact blocks 18a and 20a, respectively, by means of a bracket 45 which is slotted for engagement with the nut 44. The outer end of each of the cylinders 24 and 24a is closed by a plate 46 suitably secured to the jaws 17, 19 respectively.

In order to assist in the clamping operation I have provided rectangularly shaped wedging rings 47 and 49 encircling the clamps 15 and 16, respectively. The wedging rings 47 and 49 may be supported in the desired position by means of supports 48 attached at one end to the blocks 38 and 39, respectively, and at the other ends to the wedging rings 47 and 49, respectively. Also, the wedging rings may be welded or otherwise secured to the fixed jaws 18, 20, respectively. A removable counter-weighted wedge 50 is pivoted to each of the jaws 17 and 19 as indicated at 51 in Fig. 2 in order to bring the contacts 36 and 36a into loose engagement with the rail. It will be noted that a portion of the inner surfaces of the wedging rings 47 and 49 are convex as indicated at 52 so that the jaws 17 and 19 may rock about the wedging rings 47 and 49. When fluid is admitted to the cylinders 23 and 23a, the pressure developed forces pistons 22 to the left, as viewed in Fig. 2, against the action of springs 53. Since the jaws 17 and 19 are free to pivot about the convex surface of the wedging rings 47 and 49, respectively, the lower ends of the movable jaws 17 and 19 will be pressed toward the rails. It will be noted that the jaws are supported in such a manner as to react against one another through the agency of the wedging rings and not against the frame. It will also be observed that by means of this reaction the force developed in the cylinders 23 and 23a will be applied to both sides of the rail 21. It will further be seen that by reason of the loose fit of rod 43 in bore 43a, piston 22 is permitted to reciprocate horizontally while jaws 17 and 19 rotate about the wedging rings thereby preventing strains in rods 43.

In order to disengage the apparatus from the rails, the supply of fluid to the cylinders 23 and 23a is cut off and the cylinder connected to a fluid storage chamber as will be described at a later point. This release of pressure on the face of piston 22 permits the spring 53 to move piston 22 toward the right-end of the cylinder as viewed in Fig. 2. Fluid is next admitted to the cylinders 24 and 24a, the pressure built up therein causing pistons 25 and piston rods 26 to move to the right, as viewed in Fig. 2, thereby positively separating the contacts 36 and 36a, permitting the apparatus to be lifted from the rail.

The clamps 15 and 16 are similarly arranged except that the clamp 16 is slidable as will be more fully explained at a later point while the clamp 15 is not necessarily slidable. In order to permit motion of the clamp 16, as well as assembly of wedging ring 49 and clamping jaws 19, 20, a slot 54 is provided in the web of I-beam 10. A similar slot 55 is provided in the web of I-beam 10 to permit the assembly of wedging ring 47 and clamping jaws 17 and 18. In order to prevent a short circuit across the terminals 32 of transformers 31 it is necessary to insulate one of the clamps from the frame. This is most readily accomplished by insulating the stationary clamp 15 so as to eliminate any wear of the insulation during operation of the machine which might otherwise occur if the sliding clamp 16 were insulated. As shown in Fig. 2, a layer of insulation 56 is inserted between the upper flange 37 of the I-beam and the block 38. An insulating sleeve 56a is placed between the lower flange 41 of the I-beam and the guide 40 of the contact block 18a. A sleeve 57 of insulating material is also placed around each arm of the wedging ring 47 at the point where the arms pass through the web of the I-beam 10.

The lever 27 which forms a part of the push-up mechanism includes an arm 58 on each side of the I-beam 10 pivotally supported from the I-beam 10 by means of a shaft 59 which passes through a suitable aperture in the web of the beam 10. The shaft 59 is threaded at both ends to accommodate nuts 60 which are provided for securing the lever 27 in place. Each of the arms 58 is provided at the lower end with a slot 61 within which a block 62 is loosely fitted. The blocks 62 are pivotally secured to the extension 42 of contact block 20a by means of bolts 63 which threadingly engage extension 42. The extension 42 is provided so that the push-up force may be applied on both sides of the rail 21a along the center line of the rail. The push-up cylinder 29, as best shown in Figs. 7 and 8, is suitably journaled between the arms of a U-shaped support 64 which is secured in any suitable fashion to the upper flange of the beam 10. Each arm of support 64 is slotted to receive lateral extensions 66 of cylinder 29 and bearings 160. Cover plates 161 secured by bolts 162 complete the journal assembly. Cylinder 29 is closed at both ends by plates 163 secured in engagement with the cylinder by means of bolts 164. A piston rod 70 extends from the piston 28 through a bushing 71 secured to one of the end plates 163. A reduced extension 70a is provided on rod 70 and passes through a hole in block 72, shoulder 70b of rod 70 bearing against block 72. It will be noted that block 72 is pivotally supported between the upper ends of the levers 58 as best seen in Fig. 3. A nut 73 is secured to the reduced extension 70a of the piston rod 70. It will be apparent that any reciprocal movement of the piston 28 will be transmitted through the lever 27, contact block 20a, and contacts 36, 36a to the rail whenever clamp 16 is operatively engaged therewith. For example, suppose that the operating fluid is admitted to the cylinder 29 on the lefthand side of piston 28 as viewed in Fig. 1. As the pressure on piston 28 increases, the piston will be forced toward the right and the lever 27 will be caused to pivot about the shaft 59 in a clockwise direction thereby causing the contact block 20a and therefore the rail 21a to be moved to the left. Conversely, if the operating fluid is admitted on the righthand side of the piston 28, the rail 21a will be moved toward the right. As lever 27 rotates about the shaft 59, the projected vertical distance between the ends of the arms 58 will decrease, and since cylinder 29 and contact block 20a are so arranged that they cannot have any vertical motion, some provision must be made for this variation in vertical distance. To this end cylinder 29 is pivotally supported as described above so that it can follow the pivotal movement of lever 27 while the slot 61 and pivotal blocks 62 in the lower end of the arms 58 permits a slight reciprocating motion between the arms 58 and the blocks 62.

A set of contacts for carrying current between transformers 31 and the rails is illustrated in Fig. 5. Contacts 36 and 36a are shown engaging the rail 21a on opposite sides of the web thereof and are suitably secured to the back-up or contact blocks 19a and 20a, respectively, as by a tongue and groove arrangement. Contact 36a extends the full length of the contact mechanism and may be of a material such as beryllium copper alloy such as disclosed in Patent 1,957,214 dated August 31, 1933, issued to Edward H. Horstkotte and assigned to the same assignee as the present invention. Contact 36a may be integral with the terminal 32 as shown. The contact 36 engaging the opposite web of the rail 21a is composed of three sections 80, 81 and 82 which may be suitably attached to the back-up block 19a as by a tongue and groove arrangement. Any or all of these sections may be of the same material, as beryllium copper alloy, but preferably at least one section is of a hardened material such as hardened steel. As illustrated block 81 has been serrated in order to provide a good grip on the rail and minimize slipping of the contact. A similar pair of contacts engages rail 21.

It has been found that if objects of irregular cross section are butt welded, the articles will bend as the weld cools due to the different rates of contraction in the various portions of the article. For example, I have found that if a 131 pound rail is used, the rail must be tilted ¼ inch for each 3 feet of rail. The amount of tilt will be the same, of course, for each particular section. In Fig. 19, I have illustrated means to initially tilt one of the rails to be welded so that as the welded rail cools the rail will straighten out. I have shown a projection or tongue 36b on the side of contact 36a for engagement with a groove or recess 36c in contact block 18a. Contact 36 and block 17a are similarly arranged. The tongues are inclined at the proper angle to tilt the contacts 36 and 36a and rail 21a the desired amount.

The clamp 16 will be prevented from tilting because of the engagement of wedging ring 49 with the edges of the slot 54 in the web of the I-beam 10. If it is desired to relieve the strain on the wedging ring, block 38 may be extended so as to encircle the upper flange of the I-beam. Fig. 4 illustrates an alternative means for initially tilting the rail 21a the necessary amount with respect to rail 21. Inclined wedges 74 are secured on opposite sides of the lower flange 41 of the I-beam 10 at one end of the beam. Fulcrum blocks 75 are provided on both sides of the lower flange at the opposite end of the contact block 20a. The fulcrum block 75 may be formed in any desired shape such as a rounded rib of metal. I have interposed shims 76 on each side of the lower flange 41 between the flange and the arms of contact block 21a. Inclined wedges 77 are provided on one end of the shims 76, the wedges 77 being provided with reverse slopes as compared with the wedges 74 for slidably engaging the wedges 74. The opposite ends of the shims 76 are supported on the fulcrum blocks 75. It will be understood that the above described arrangement is provided on both sides of the web of beam 10 so that, in the embodiment described, there are four wedges 74, four fulcrums 75, and four wedges 77. As best shown in Fig. 3, three shims 76 are used since the shim engaging the under side of beam 10 may be as wide as the lower flange and there is no web to be considered at this point. The outer ends of shims 76 are joined by a plate 78 by welding. The righthand end of the flange 41 of I-beam 10 is tapped and threaded to accommodate an adjusting screw 79 which passes through a suitable aperture in member 78. As the adjusting screw 79 is moved inwardly, or to the left as viewed in Fig. 4, the shims 76 and therefore the wedges 77 will be forced toward the left with respect to the wedges 74. Therefore, since the beam is fixed against vertical movement, the shims 76 will tend to move in a clockwise direction about the fulcrum blocks 75. This movement is transmitted through the contact block 20a and the contacts 36 and 36a to the rail 21a thereby tilting the rail 21a with respect to rail 21. It will be obvious that if the adjusting screw is moved in the opposite direction the righthand end of rail 21a will be elevated with respect to the end of the rail to be welded. Collar 79a is suitably attached to screw 79 for loosely securing screw 79 to plate 78. Since shims 76 move vertically with respect to the I-beam 10, I make the aperture in plate 78 large enough to permit screw 79 to move vertically with respect to plate 78, thereby preventing stresses in the adjusting mechanism. The amount of tilting necessary to provide a straight rail after cooling is best determined by experiment.

In butt welding of the type where the abutting objects to be welded are first heated and then forced together, a certain amount of metal is upset at the joint thereby forming a bead. I have illustrated in Figs. 6 and 10 a device which is suitable for removing this bead. In the arrangement illustrated, cutters 83 and 84 for the top and bottom of the rail, respectively, have been provided. Obviously, if desired, cutters may be provided for the other surfaces. In order to prevent deposition of metal on the cutting edges during the welding operation, cutters 83 and 84 are removable. As illustrated, cutter 84 is suitably removably secured to the contact blocks 19a and 20a as by a slot and key arrangement. The upper cutter 83 is held against the upper surface of the rail by means of bolts 85 which extend through the cutters 83 and 84, the lower ends of the bolts 85 being slotted for the reception of locking wedges 86. The forward edges of the tools 83 and 84 are notched as indicated at 83a to provide a cutting edge which will engage the bead 87 at an angle with respect to the direction of the bead in order to gradually cut away the bead. Cutter 83 is made of such size that its rear surface engages the forward surface of contact block 20a. Therefore, during the push-up operation the force necessary to trim the bead is transmitted to cutters 83 and 84 through blocks 20a and 19a respectively and bolts 85 are not required to withstand any substantial horizontal forces.

A possible arrangement of a hydraulic system for operating the pistons associated with the welding apparatus is illustrated in Fig. 9. The pump 34 is connected by suitable conduits with cylinders 23 and 24 through a two-way valve 88 and with cylinders 23a and 24a through a two-way valve 89. The pump 35 is connected with push-up cylinder 29 by means of a two-way valve 90 and suitable conduits. Assuming that the clamps are in the unclamped position, the clamping operation may be carried out as follows. After pump 34 is started, in order to operate clamp 15, valve 88 is turned to direct the operating fluid from pump 34 by way of conduits 91, 92, valve 88 and conduit 93 into the righthand end of cylinder 23 as viewed in Figs. 2 and 9. With this setting of valve 88, conduit 94 leading from cylinder 24 is put into communication with conduits 95 and 96 so that any fluid which remained in cylinder 24 after a previous operation of the clamping tongs 15 will be returned to the storage tank 97 by the pumping action and the movement of the piston 25 in cylinder 24 which is forced to the left during the clamping action, as will be apparent from Fig. 2, which tends to force the fluid toward storage tank 97.

In order to release the clamp 15, valve 88 is turned to the other position, in which case the flow from pump 34 will now trace a path through conduits 91, 92, valve 88 and conduit 94 into cylinder 24. At the same time a passage will be opened between cylinder 23 and storage tank 97 through conduit 93, valve 88, conduit 95 and conduit 96. The pumping action cooperates with the positive pressure of spring 53 acting to move piston 22 to the right, as seen in Fig. 2, to return fluid to the storage tank. Valve 89 is connected in parallel with valve 88 so that the operation of the clamp 16 will be similar to that described above and it is thought unnecessary to repeat the description. Pump 35 and storage tank 98 are associated with valve 90 and push-up cylinder 29. During push-up, valve 90 is turned so that operating fluid may flow from pump 35 through conduit 99, valve 90 and conduit 100 to the left end of push-up cylinder 29 as viewed in Figs. 1 and 9. During the push-up operation, any fluid remaining from the last operation of the apparatus passes from the right-hand end of cylinder 29 through conduit 101, valve 90 and conduit 102 into storage tank 98. When it is desired to retract the push-up mechanism, valve 90 is turned to its other position in which position operating fluid is supplied from pump 35 through conduit 99, valve 90 and conduit 101 to the right-hand end of cylinder 29. With this setting of valve 90, any fluid in the left-hand side of the cylinder 29 will be withdrawn through conduit 100, valve 90 and conduit 102 into storage tank 98. Obviously, pumps 34 and 35 draw operating fluid from tanks 97 and 98, respectively, through conduits 103 and 104, respectively.

As is well known to those skilled in the art, a very large amount of sparking and splashing of hot metal occurs in a welding operation such as that performed by the apparatus described above. In order to prevent a deposit of this metal on the lower flange of the beam 10, I have provided a splatter guard 105 as illustrated in Figs. 1, 6 and 10. This guard is adapted to be readily replaced, and may be of any suitable material. As illustrated, the guard 105 covers three sides of the lower flange 41 of the I-beam 10 and extends into the contact blocks 18a and 20a (see Fig. 1) a sufficient distance to protect the I-beam. The recess in contact block 20a must be cut back enough to receive the guard 105 during the push-up operation. To assist in adjusting the splatter guard 105 and maintain it in position, I provide a cover 106 therefor having handles 107 suitably secured thereto. The cover 106 is provided with projections which fit slots 108 as shown in Fig. 1, thereby holding the parts in assembled relation.

I have found that different types of rails or other objects to be welded require different amounts of heating, and I have also found that different articles must be heated different distances back from the joint to be welded for best results. In order definitely to position the welding apparatus at the proper point I provide a stop 109 secured as by welding to the flange 41 of I-beam 10. By lowering the apparatus onto rails 21, 21a so that stop 109 is aligned with the joint to be welded the welding machine will be accurately centered. I contemplate interposing a block 110 of insulating material, as wood for example, between stop 109 and contact block 18a in order to insulate clamp 15 from stop 109. A second stop 111 is provided at the other end of clamp 15, the clamp being insulated from stop 111 by a block of insulating material 112, as wood for example. Whenever the centering stop 109 is used, the cover 106 for splatter guard 105 must be shaped to fit around stop 109 and block 110.

It will be apparent that practically the entire weight of the machine is localized on I-beam 10. To diminish the forces tending to buckle horizontal frame section 11 when the apparatus is lifted, I provide a strap 158 joining section 11 and beam 10 so that part of the lifting force is transmitted to beam 10 through strap 158.

The operation of the embodiment of my invention described above will now be described. Assuming that the tilting mechanism has been adjusted and that the apparatus has been properly located with respect to the joint to be welded, wedges 50 are inserted between the wedging rings 47, 49 and movable jaws 17, 19, respectively, thus directing the pairs of contacts 36 and 36a into engagement with the rails 21 and 21a, respectively. Valve 88 is then turned to the position which will admit operating fluid to cylinder 23. Assuming that pump 34 is operating, fluid will be admitted to the cylinder 23 as descibed above, the hydraulic pressure developed therein forcing the piston 22 to the left as viewed in Fig. 2. The jaw 17 will be moved in a counterclockwise direction about surface 52 of wedging ring 47 as a pivot point. This action serves to clamp contacts 36 and 36a on the rail 21.

The clamp 16 is next moved along the I-beam 10 to the proper distance from the joint to be welded by means of the push-up mechanism 27 under control of valve 90 as previously described. The clamp 16 is next operated in a manner similar to that described in connection with clamp 15, valve 89 being operated for this purpose. The splatter guard is next secured in position. The welding transformers are then connected to a source of power following which valve 90 is operated to cause the push-up mechanism to move the rail 21a into sparking engagement with the rail 21. The rails are left in this position a sufficient time to adequately heat the metal at the joint, the proper length of time being determined by experiment. As soon as the proper temperature has been reached, the push-up mechanism is again operated to apply additional pressure to the joint and upset a portion of the metal at the joint, forming a bead 87. Following this operation the welding power is cut off, clamp 16 is loosened by operating valve 89 and the splatter guard 105 removed. In order to cut the flash, or bead, the flash remover is wedged into position and the push-up mechanism again advanced. Since clamp 16 is unclamped, the contact blocks 19a and 20a will be advanced along the rail 21a so that the cutting tools 83 and 84 will be advanced into engagement with the bead or flash 87. After this operation, the clamps 15 and 16 are opened, the flash cutter is removed and the machine lifted from the rail and advanced to the next joint to be welded. If desired, an automatic push-up may be used whereby the rail 21 is advanced slowly during the sparking engagement and then rapidly to complete the weld.

A modification of the above-described embodiment is illustrated in Figs. 11 to 16, inclusive. In this modification I have shown a horizontal frame 115 supported in a vertical frame 116 which is provided with a bail 117 by means of which the machine as a whole may be lifted from place to place through the agency of a crane, the hook 118 of which is indicated in the drawings.

The frame 116 is provided with two supporting shafts 119 upon which two pairs of clamping tongs or jaws 127 and 128 are supported. It will be noted that the clamping jaws are supported on the shafts 119 in such a manner that they react against one another through a clamping mechanism and not against the shafts 119 which serve only to support the jaws in the framework of the machine. These jaws are pressed into engagement with the rail ends by hydraulic pressure applied through pistons 120 within cylinders 121 and 121a supported in the clamping means encircling the lower portions of the jaws. It will be observed that pistons 120 are provided with guides 122 attached thereto and adapted to reciprocate in slots 123 provided in the inner wall of cylinders 121 and 121a. The pistons 120 are operated in one direction by fluid pressure admitted to the cylinders 121 through conduits 124 (Fig. 15) and the clamps are separated under the action of springs 125 (Fig. 14) located between the arms of each of the clamping jaws.

The clamping jaws 127 and 128 may be moved relatively to one another by a push-up mechanism including double acting piston 131 located in a casting 132 forming part of the horizontal frame 115. This piston acts through a pivotally supported vertical portion 133 of the vertical frame 116 against the clamping mechanism of jaws 128 to move these clamping jaws relative to the fixed jaws 127 located at the other side of the vertical frame 116. The clamping jaws 128 are slidably mounted on flanges 135 forming part of the longitudinally extending members of the horizontal frame 10 and shaft 119.

The machine is adapted to be guided onto the rails being welded by centering plates 136 secured to cylinders 121 and 121a and forming part of the clamping mechanism as shown, or in any suitable manner to the frame and having a configuration which causes the machine to be guided into position on the rails when lowered thereon. As shown in Fig. 16, ears 136a are provided on either side of the rail depending from a portion 136b of the plate 136. One end of the machine is provided with a supporting wheel 137 which is adapted to engage one of the rails being welded and permit the apparatus to be moved along the rail without damaging the upper surface of the rail head.

In order to prevent tipping of the apparatus a cross bar 138 is provided which is loosely mounted in a support 139 secured to the horizontal frame 115 at the opposite end of the apparatus from the wheel 137. The cross bar 138 may be moved laterally of the machine to a position in which clamps 140 located at one end thereof are adapted to engage a rail on the other side of the track. A drift pin 141 and perforated bracket 141a are provided to locate the machine relative to the joint to be welded, the position of the pin relative to the rail end being determined by experiment.

Welding current is supplied from transformers 126 suitably secured to clamps 127 as by brackets 129 and bolts 130, the transformers being connected in parallel by terminals 142 engaging the ends of the rail at the joint to be welded. The transformers 126 are protected, to a certain degree, from shocks caused by rough handling, by reason of the resiliency of spring 125 between the arms of the clamping jaws.

The stationary clamp 127 is insulated from it supporting shafts 119 at 143, 144, 145, from horizontal frame 115 at 146, and from vertical shaft 116 at 147. Pumping units 148 and 149 are provided for the clamping and push-up mechanisms, respectively, and the upper frame is divided into compartments 150 and 151 for the storage of the fluid used in operating the clamp and push-up mechanisms, respectively. In Fig. 15 I have shown schematically a system for supplying fluid to the various cylinders for operating the mechanism. The operation is similar to that described above so that it will suffice to say at this point that pumping unit 148 and valves 158 and 159 are provided for controlling clamping jaws 127 and 128, respectively, and that valve 160 is associated with pumping unit 149 and the push-up cylinder 131.

It may prove desirable to cool those portions of the clamping jaws and transformer connections which make engagement with the rails, in which case an additional pumping unit will be provided for circulating a cooling fluid as water from a suitable source through the members to be cooled.

It may also prove desirable to cool the transformers by circulating air thereover and a fan 153 is provided for this purpose, the air supplied by the fan being directed over the transformers from a conduit 154.

A second modification of my invention is illustrated in Figs. 17 and 18. The mechanism disclosed in these figures is similar to the modification shown in Figs. 11 to 16 except that the apparatus is mounted on wheels 155 so that the apparatus may be transported along the track. Each set of wheels is provided with an hydraulic lifting cylinder 156 so that when the apparatus is positioned at the joint to be welded, the wheels may be elevated about a pivot 157 thereby lowering the clamping members for engagement with the rails.

While I have described my invention in connection with flash welding apparatus, it will be apparent that the above described apparatus is equally suitable for use with other forms of welding.

Furthermore, it will be obvious that, while I have described my invention as a rail welder, my invention is equally applicable for butt welding any heavy sections, as for example, pipes, rods, and so on.

While I have shown my invention in connection with particular embodiments of a rail welder, I do not desire my invention to be limited to the particular constructions shown and described and I intend in the appended claims to cover all modifications within the spirit and scope of my invention.

What I claim as new and desire to secure by Letters Patent of the United States, is:

1. Welding apparatus comprising a frame, a plurality of pairs of clamping jaws on said frame, an article engaging contact on each of said jaws, means acting on said jaws to force said contacts toward each other into engagement with the articles to be welded, means acting on said jaws to separate said contacts for releasing said articles, means to move said jaws longitudinally with respect to each other along said frame for moving said articles into and out of abutting relationship, means to position said apparatus with respect to said articles preparatory to welding so that the ends of said articles extend beyond said contacts a predetermined distance, means for tilting one of said articles with respect to the other of said articles, means to protect said frame from the metal ejected from the weld during the welding operation, and means detachably secured to certain of said contacts for removing the bead formed during the welding operation.

2. Butt welding apparatus comprising a pair of work holding members arranged to support an article to be welded, means to move one of said members relatively to the other of said members for clamping said article therebetween and means to move one of said members relatively to the other of said members away from said article for releasing the same, said clamping and releasing means being independent and each comprising a cylinder, a plunger therein and means to move said plunger in said cylinder.

3. Welding apparatus comprising a support, a plurality of pairs of clamping jaws carried by said support, each of said pairs of jaws including a fixed jaw and a movable jaw, and each of said fixed jaws having a first guide in engagement with a portion of said support and a second guide in engagement with a second portion of said support, a member encircling each pair of clamping jaws, cylinders secured to the upper ends of each of said fixed jaws, pistons arranged to reciprocate within said cylinders, piston rods attached to said pistons and engaging said movable jaws, wedges interposed between said encircling members and said movable jaws whereby said movable jaws may be pivoted about said encircling members to press the lower ends of said movable jaws into engagement with the articles to be welded, cylinders associated with the lower ends of said movable jaws, pistons within said second mentioned cylinders having piston rods engaging said second guide, and hydraulic means for operating one or the other of said pistons for selectively clamping or releasing said articles.

4. Butt welding apparatus comprising a frame, a pair of work clamping members carried by said frame, means for moving one of said clamping members relative to the other of said clamping members selectively to clamp and release an article to be welded, means encircling said clamping members, said clamping members acting against each other and reacting against said encircling means whereby none of the clamping and releasing forces are transmitted to said frame.

5. Butt welding apparatus comprising a pair of work clamping members for supporting an article to be welded, a member encircling said pair of clamping members and acting as a fulcrum for pivotally supporting at least one of said members and means for moving said pivotally supported member relative to said other member selectively to clamp and release said article to be welded.

6. Welding apparatus comprising a support, a plurality of clamping means on said support for clamping articles to be welded in abutting relation, and a wedge interposed between said support and one of said clamping means for tilting one of said clamping means and one of said articles with respect to the other of said clamping means and the other of said articles.

7. Welding apparatus comprising a frame, two pairs of clamping jaws for clamping articles to be welded, said jaws being supported by said frame and one of said jaws having a portion encircling a portion of said frame, and a wedge interposed between said frame and said encircling portion for tilting one of said jaws and one of said articles held thereby with respect to the other of said jaws and the articles held thereby.

8. Apparatus for welding articles of irregular cross-section comprising a support, clamping means for holding said articles to be welded in abutting relationship, a shim between said support and one of said clamping means, a fulcrum on one end of said support in engagement with one end of said shim and means to move the other end of said shim about said fulcrum as a pivot point for tilting said one of said clamping means and the articles supported thereby relative to said other clamping means and the articles supported thereby.

9. Butt welding apparatus for welding articles of irregular cross-section comprising a frame, an I-beam carried by said frame, a pair of clamping means on said beam for supporting a pair of articles to be welded, one of said means having a portion encircling the lower flange of said beam and means for tilting one of said articles with respect to the other of said articles whereby said articles will be properly aligned after welding, said means including wedges located on opposite sides of said lower flange of said beam, said wedges having inclined surfaces of opposite slope, fulcrums located on opposite sides of said lower flange between said wedges and the point of welding, shims on opposite sides of said lower flange between said flange and said encircling portion and supported at one end on said fulcrums, said shims having wedges thereon for engagement with said first mentioned wedges and means for moving said shims lengthwise of said beam whereby said second mentioned wedges slide on said first mentioned wedges to selectively raise or lower one end of said shims and thereby tilt said one of said clamping means.

10. Welding apparatus comprising a frame, a plurality of work engaging clamps carried by said frame for holding articles to be welded, one of said clamps including a plurality of oppositely disposed jaws, means acting on said jaws to force said jaws toward each other and into engagement with one of said articles, each of said jaws including a contact member for engaging one of said articles and a contact supporting member, one of said members having a projection and the other of said members having a recess for receiving said projection, said projection and said recess being so disposed with respect to said members that said contact members associated with said one of said clamps and the article carried thereby are tilted with respect to the other of said clamps and the article carried thereby.

WILLIAM DALTON.